United States Patent [19]
Sepp et al.

[11] Patent Number: 4,784,448
[45] Date of Patent: Nov. 15, 1988

[54] RETROMODULATOR

[75] Inventors: Gunter Sepp, Ottobrunn; Gunthard Born, Munich, both of Fed. Rep. of Germany

[73] Assignee: Messerschmitt-Bölkow-Blohm GmbH, Munich, Fed. Rep. of Germany

[21] Appl. No.: 4,059

[22] Filed: Jan. 16, 1987

[30] Foreign Application Priority Data

Jan. 22, 1986 [DE] Fed. Rep. of Germany ....... 3601764

[51] Int. Cl.$^4$ ...................... G02B 26/08; G02B 5/122
[52] U.S. Cl. ..................................... 350/6.6; 350/358;
350/487; 350/102; 29/25.35; 372/93
[58] Field of Search ................ 350/6.6, 6.8, 356, 358,
350/359, 360, 484, 486, 487, 102; 29/25.35;
372/20, 93

[56] References Cited

U.S. PATENT DOCUMENTS

| | | | |
|---|---|---|---|
| 1,438,974 | 12/1922 | Wente | 350/487 |
| 3,544,201 | 12/1970 | Fowler et al. | 350/487 |
| 3,614,677 | 10/1971 | Wilfinger | 350/487 |
| 3,833,893 | 9/1974 | Rajchman | 350/102 |
| 3,886,310 | 5/1975 | Guldberg et al. | 350/360 |
| 4,096,380 | 6/1978 | Eichweber | 350/102 |
| 4,157,863 | 6/1979 | Clark | 350/359 |
| 4,216,440 | 8/1980 | Rahn et al. | 372/93 |
| 4,339,821 | 7/1982 | Coppock et al. | 350/358 |
| 4,450,458 | 5/1984 | Araghi et al. | 350/360 |
| 4,688,306 | 8/1987 | Soni et al. | 29/25.35 |

*Primary Examiner*—John K. Corbin
*Assistant Examiner*—Loha Ben
*Attorney, Agent, or Firm*—Kenyon & Kenyon

[57] ABSTRACT

A retromodulator in the form of a triple mirror with electromechanical transducer elements for planar deformation by which incident light radiation is retroflected in modulated form. At least one face of the retromodulator is formed as an oscillatory diaphragm which is excited to natural oscillations by the transducer elements. In a preferred form of realization, the oscillatory diaphragm comprises a piezoelectric foil, on whose inner side a reflecting layer is applied and on whose outer side electrodes are applied to which the modulation signal is applied.

5 Claims, 1 Drawing Sheet

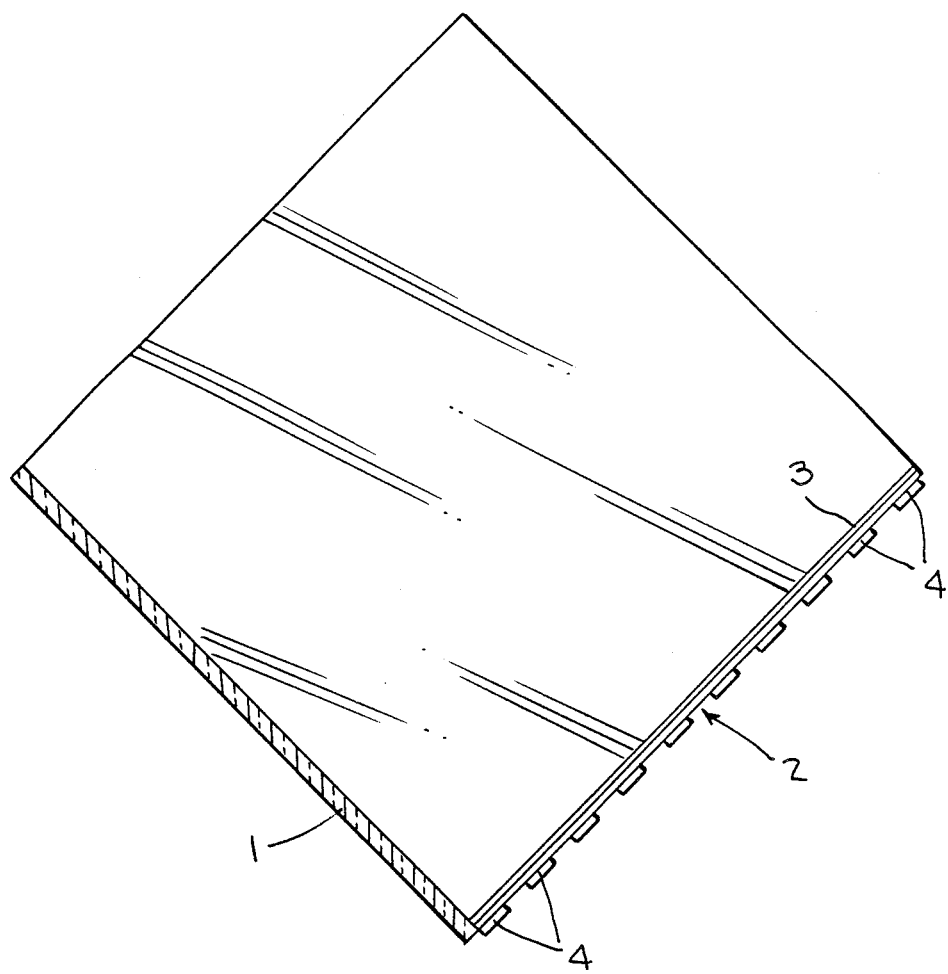

RETROMODULATOR

BACKGROUND OF THE INVENTION

The present invention relates to a retromodulator in the form of a triple mirror.

Retromodulators are needed, for example, for the transmission of data, for which on the transmitter side only a limited reserve of energy is available which does not permit emission of high power signals. This is the case, for example, with satellites, military missiles, monitoring stations, etc. By using a retromodulator, one can proceed as follows: The retromodulator receives a light beam originating from the calling station, modulates it with the data to be transmitted, and reflects the light beam back to the calling station. (By light is understood here a spectral range extending for example, from 0.3 to 20 μm).

A retromodulator in the form of a triple mirror is known, for example, from DE-PS No. 32 30 159. In this retromodulator, the triple mirror consists of two fixed continuous mirror surfaces and of a mirror surface which is composed of a pattern of mirror surface elements. On the back of some of the mirror surface elements piezoelements are applied. Without a voltage applied to the piezoelements, all mirror surface elements are coplanar; by an applied voltage, the part of the mirror surface elements on which piezoelements are applied is displaced in accordance with the voltage, so that there results a phase modulation of the incident radiation retroreflected by the retromodulator.

While this known retromodulator permits modulation of the reflected light at high frequency, its construction is complicated due to the many separate mirror elements with the respective piezoelements, so that the known retromodulator is expensive to manufacture.

Moreover, high voltages in the kV range are necessary, to produce piezo deflections in the order of micrometers.

From U.S. Pat. No. 4,216,440, a prism consisting of piezoelectric material is further known, on whose sides finger-like electrodes are vapor deposited. While the manufacture of this prism is comparatively inexpensive, being a one-piece prism of piezo material, no great modulation magnitudes and high modulation frequencies are possible due to strong internal forces.

SUMMARY OF THE INVENTION

It is an object of the present invention to provide a retromodulator which permits great modulation magnitudes and high modulation frequencies combined with cost effective design.

The above and other objects of the present invention are achieved by a retromodulator in the form of a triple mirror having electromechanical transducer elements for planar deformation, by which incident light radiation is retroreflectable in modulated form, at least one plane being formed as an oscillatory diaphragm, the transducer elements exciting the diaphragm to natural oscillations.

According to the invention, at least one mirror face of the triple mirror or respectively of the hollow cube is formed as an oscillatory diaphragm. The transducer elements, which transform the electrical modulation signals into mechanical deflections, excite the diaphragm to natural oscillations. This results in great deflections of the deformed mirror face and hence great modulation magnitudes.

High modulation frequencies are readily obtainable by appropriate design of the oscillatory diaphragm and appropriate selection of the natural oscillation.

As the mirror surface of the retromodulator formed as an oscillatory diaphragm is in one piece, the manufacturing costs are comparatively low.

As an oscillatory diaphragm there may be used a variety of diaphragms capable of being excited to oscillations by electromechanical transducers, for example, loudspeaker diaphragms, etc.

Especially advantageous, however, is the use of a piezo foil as an oscillatory diaphragm. Such piezoelectric foils, which may comprise, for example, of polyvinylidene fluoride, have a high mechanical stability and are available in thin foil thicknesses ranging from a few micrometers to some 10 micrometers, so that they are capable of being excited with very low excitation energies to natural oscillations of high amplitude and frequency.

The excitation of the piezo foils can occur, for example, by the fact that at the locations of the antinodes, electrodes are vapor deposited, to which the modulation signal is applied.

The actual mirror, which reflects the laser beam, is likewise applied on the oscillatory diaphragm.

BRIEF DESCRIPTION OF THE DRAWING

With reference now to the drawing, the single figure shows a transverse section through a retromodulator according to the invention.

DETAILED DESCRIPTION

The retromodulator has three mirror surfaces. Mirror surface 2 is formed as an oscillatory diaphragm and consists of a piezoelectric foil which is metallized on its reflecting 3 facing the interior of the hollow cube and is provided on its outer side with electrodes 4 indicated only schematically.

The electrodes 4 are distributed over the outside of the piezo-electric foil in such a way that when electric signals are applied, they excite the mirror surface 2 to natural oscillations.

Possible natural oscillations and the electrode distribution required to cause those natural oscillations are described, for example, in NASA Report Nasa St-160 "Vibration of Plates". Concerning the form of possible natural oscillations, reference is made expressly to the content thereof.

The resonance deflection of mirror faces provided according to the invention has a number of advantages:

Resonance deflection of the mirror surface is greater by orders of magnitude than the usual piezo deflection: Typically, for example, in the state of the art as known, for example, from U.S. Pat. No. 4,216,440, a voltage of 1 kV is needed to obtain a piezo deflection of 1 μm. With resonance deflection, on the contrary, a voltage of 100 V results in a deflection of 0.1 mm. Thus, the retromodulator according to the invention permits great modulation magnitudes.

As the deformed mirror surface is in one piece, the retromodulator according to the invention can be manufactured comparatively cost-effectively.

Through appropriate selection of the excited natural oscillations, high deflections and high modulation frequencies can be obtained.

In the foregoing, the invention has been described with reference to an embodiment. Under the general concept of the invention, to form at least one face of a retromodulator as an oscillatory diaphragm which is excited to natural oscillation, a variety of modifications are possible:

For example, more than one face may be deformable. Also it is possible to vapor deposit on the piezo foil different electrode patterns which excite different natural oscillations and are addressed by the "modulation signal" as needed.

Further, instead of the preferably used piezo foil some other oscillatory diaphragm may be used, which is excited to natural oscillations by appropriate electromechanical transducers.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. A retromodulator in the form of a triple mirror comprising three mirror surfaces, each disposed in a plane, at least one surface having electromechanical transducer elements for planar deformation, by which incident light radiation is retroreflectable in modulated form, wherein at least one plane is formed as an oscillatory diaphragm, a plurality of transducer elements affixed to the diaphragm exciting the diaphragm to natural oscillations.

2. The retromodulator recited in claim 1, wherein the oscillatory diaphragm is a piezoelectric foil.

3. The retromodulator recited in claim 2, wherein the oscillatory foil comprises a fluoro polymer and more particularly a polyvinylidene fluoride.

4. The retromodulator recited in claim 2, wherein on the back of the piezoelectric foil electrodes are applied, the number, size and form of which are matched to the natural oscillations of the diaphragm.

5. The retromodulator recited in claim 1 wherein a reflecting layer is applied on the inner side of the oscillatory diaphragm.

* * * * *